United States Patent
Ko

(10) Patent No.: US 10,122,032 B2
(45) Date of Patent: Nov. 6, 2018

(54) FUEL CELL STACK WITH MULTILAYER TYPE COLLECTOR PLATE

(71) Applicants: Hyundai Motor Company, Seoul (KR); Kia Motors Corporation, Seoul (KR)

(72) Inventor: Haeng Jin Ko, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 28 days.

(21) Appl. No.: 15/201,169

(22) Filed: Jul. 1, 2016

(65) Prior Publication Data

US 2017/0092967 A1    Mar. 30, 2017

(30) Foreign Application Priority Data

Sep. 24, 2015   (KR) ................. 10-2015-0135234

(51) Int. Cl.
*H01M 8/04225* (2016.01)
*B60L 11/18* (2006.01)
(Continued)

(52) U.S. Cl.
CPC ..... *H01M 8/04225* (2016.02); *B60L 11/1885* (2013.01); *B60L 11/1888* (2013.01);
(Continued)

(58) Field of Classification Search
CPC .......... H01M 8/04225; H01M 8/0202; H01M 8/0247; H01M 8/0256; H01M 8/04007; H01M 8/04052; H01M 8/0253; H01M 8/04268; H01M 8/24; H01M 8/2465; H01M 8/248; B60L 11/1888; B60L 11/1885
See application file for complete search history.

(56) References Cited

U.S. PATENT DOCUMENTS 8,076,017 B2 * 12/2011  Matsumoto .......... H01M 8/241
                                                                429/66
8,535,842 B2    9/2013  Thompson et al.
(Continued)

FOREIGN PATENT DOCUMENTS

JP       64-38765 U      3/1989
JP    2004-311084    * 11/2004  ............. H01M 8/24
(Continued)

OTHER PUBLICATIONS

European Search Report for European Patent Application No. 16180130.3, dated Oct. 28, 2016, 7 pages.

*Primary Examiner* — Helen Oi K Conley
(74) *Attorney, Agent, or Firm* — Mintz Levin Cohn Ferris Glovsky and Popeo, P.C.; Peter F. Corless

(57) ABSTRACT

A fuel cell stack is provided which manually increases the temperature of cells arranged in the vicinity of an end plate of the stack to improve starting performance of a fuel cell vehicle at temperatures below zero and driving performance thereof at low temperatures. The fuel cell stack realizes rapid thawing and heating functions in response to freezing of end cells when a vehicle is started at temperatures below zero, using a multilayer current collector having at least one thin collector plate which is structurally and sensitively expandable or contractible based on temperature changes.

10 Claims, 4 Drawing Sheets

<DURING START UP AT LOW TEMPERATURE>

<AFTER TEMPERATURE INCREASE>

(51) Int. Cl.

| | | |
|---|---|---|
| *H01M 8/0247* | (2016.01) | |
| *H01M 8/0256* | (2016.01) | |
| *H01M 8/04007* | (2016.01) | |
| *H01M 8/04223* | (2016.01) | |
| *H01M 8/24* | (2016.01) | |
| *H01M 8/2465* | (2016.01) | |
| *H01M 8/248* | (2016.01) | |
| *H01M 8/0202* | (2016.01) | |

(52) U.S. Cl.
CPC ....... *H01M 8/0202* (2013.01); *H01M 8/0247* (2013.01); *H01M 8/0256* (2013.01); *H01M 8/04007* (2013.01); *H01M 8/04052* (2013.01); *H01M 8/04253* (2013.01); *H01M 8/04268* (2013.01); *H01M 8/24* (2013.01); *H01M 8/248* (2013.01); *H01M 8/2465* (2013.01); *H01M 2250/20* (2013.01); *Y02T 90/32* (2013.01)

(56) References Cited

U.S. PATENT DOCUMENTS

| | | |
|---|---|---|
| 2006/0110649 A1 | 5/2006 | Nishiyama et al. |
| 2006/0204806 A1* | 9/2006 | Takada ............... H01M 8/0267 429/434 |
| 2008/0044712 A1* | 2/2008 | Ko ..................... H01M 8/0297 429/442 |
| 2015/0243940 A1 | 8/2015 | Kang |
| 2016/0141643 A1 | 5/2016 | Fukuyama et al. |

FOREIGN PATENT DOCUMENTS

| | | |
|---|---|---|
| JP | 2005-310700 A | 11/2005 |
| JP | 5434089 B2 | 3/2014 |
| KR | 10-0747865 B1 | 8/2007 |
| KR | 10-2009-0007023 A | 1/2009 |
| KR | 2011-0137637 A | 12/2011 |
| KR | 2012-0007771 A | 1/2012 |
| KR | 10-1219342 B1 | 1/2013 |
| WO | 2015/012064 A1 | 1/2015 |

* cited by examiner

<DURING START UP AT LOW TEMPERATURE>   <AFTER TEMPERATURE INCREASE>

FUEL CELL STACK WITH MULTILAYER TYPE COLLECTOR PLATE

CROSS-REFERENCE TO RELATED APPLICATION

This application claims under 35 U.S.C. § 119(a) the benefit of priority to Korean Patent Application No. 10-2015-0135234 filed on Sep. 24, 2015, the entire contents of which are incorporated herein by reference.

BACKGROUND (a) Technical Field

The present disclosure relates to a fuel cell stack with a multilayer type collector plate, and more particularly, to a fuel cell stack capable of manually increasing the temperature of cells arranged proximate to an end plate of the stack to improve starting performance of a fuel cell vehicle at temperatures below zero and driving performance thereof at low temperatures.

(b) Background Art

In general, a fuel cell stack includes a plurality of unit cells configured to generate electricity, end plates which are disposed on both sides of the stacked unit cells to fixedly support the unit cells, and current collector plates which are disposed inside the end plates to collect electricity generated by the unit cells and to transmit the same to the outside.

Meanwhile, FIG. 6 illustrates a cell temperature profile when a fuel cell stack is operated according to the related art. As illustrated in FIG. 6, a cell disposed at the center of the stack has the highest temperature, and cells disposed at both ends of the stack adjacent to end plates (hereinafter, referred to as "end cells"), have relatively low temperatures. When the stack is operated, the temperature of each cell increases by the exothermic reaction thereof. However, the temperature of each end plate, made of stainless and plastic, is relatively low since a thermal loss from the end plate is greater than from the central portion of the stack due to the influence of outside air (or atmospheric air), with the consequence that generated water remains therein and therefore the voltage of each end cell is reduced.

In particular, when the temperature of the end cell is less than the operating temperature of the stack, the voltage of the cell is reduced due to the flooding of the cell, deterioration of the activation energy thereof, etc. As a result, the performance of the stack is reduced, and cell degradation occurs since electrodes are damaged when cell performance is reduced for a long period of time, which leads to a reduced lifespan of the stack. When the reduction in voltage of a specific cell is greater in a fuel cell vehicle, shut-down logic is typically applied to the vehicle. Therefore, a driver may be faced with unexpected situations when driving the vehicle.

Particularly, it is necessary to improve reliability of operation of the fuel cell stack by uniformly distributing the cell temperature to maintain the temperature of the end cells to be the same as that of all of the cells in the stack under a sub-zero starting condition during the winter season, in which generated water may freeze, or a low-temperature operation condition. Accordingly, a system has been developed in the related art in which the temperature between an end plate and an end cell is increased to prevent the cell temperature from being decreased in the vicinity of the end plate.

For example, the related art discloses a technology in which a structure for circulating high-temperature coolant discharged from a stack is applied to an end plate to prevent the temperature of a cell disposed at the end of the stack from being lowered. In another example, the related art discloses a technology for combusting and heating a hydrogen-air mixture in a compartment within a terminal plate, as a heating means for thawing during the cold startup of a stack. However, in the related art, when coolant is not circulated to increase the temperature of the cell when the stack is started at temperatures below zero, the end cell may not be substantially heated. In addition, since hydrogen is combusted in the compartment within the terminal plate for thawing the end cell during the cold startup of the stack, it is disadvantageous in terms of use of hydrogen and vehicle fuel efficiency, and there is a safety problem relating to the removal of hydrogen remaining in the compartment within the terminal plate, in which a high electric potential is formed.

The above information disclosed in this section is merely for enhancement of understanding of the background of the invention and therefore it may contain information that does not form the prior art that is already known in this country to a person of ordinary skill in the art.

SUMMARY

The present invention provides a fuel cell stack capable of realizing rapid thawing and heating functions in response with freezing of end cells (e.g., cells disposed at both ends of the stack adjacent to end plates), which may occur when a vehicle is started at temperatures below zero, using a multilayer current collector having at least one thin collector plate which is structurally and sensitively expandable or contractible based on temperature changes.

In an exemplary embodiment, a fuel cell stack with a multilayer type collector plate may include end plates disposed at opposite sides of stack cells stacked in a line to fixedly support the stack cells, and current collectors disposed inside the end plates to collect electricity generated by the stack cells and transmit the electricity to the outside, wherein at least one of the current collectors disposed at the opposite sides of the stack cells may include a first collector plate having a current collection terminal, and a second collector plate stacked on one surface of the first collector plate, and a gap for performing a thermal insulation function may be formed between the first and second collector plates by thermal contraction of the stack cells at temperatures below zero.

An elastic member may be inserted between a terminal aperture formed in each of the end plates and the current collection terminal of the first collector plate passing through the terminal aperture, to elastically support the current collection terminal. Stepped portions may be respectively formed in the terminal aperture and the current collection terminal, and the elastic member may be accommodated between the stepped portion of the current collection terminal and the stepped portion of the terminal aperture, which face each other when the current collection terminal is inserted into the terminal aperture.

The first collector plate may have a rough structure on one surface thereof facing the second collector plate. The first collector plate may be a thin collector plate having a thickness less than the second collector plate. Additionally, the first collector plate may be stacked to come into contact with the stack cells, and the current collection terminal of the first collector plate may be inserted through an aperture in the second collector plate and a terminal aperture in the associated one of the end plates. The first collector plate may have a thickness of about 0.05 to 0.2 mm.

The gap may be formed between the first and second collector plates at a low temperature of about −20 to −30° C., and the first and second collector plates may form a minimum contact resistance by fastening pressure of the stack when the temperature is increased to a predetermined temperature above zero. The first and second collector plates may form a minimum contact resistance by the fastening pressure of the stack at a temperature of about 40 to 70° C. The current collection terminal may be bonded to the first collector plate to be integrated therewith, may be assembled to the first collector plate to be integrated therewith by a fastening mechanism, or may be pressed against the first collector plate to be electrically connected thereto.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
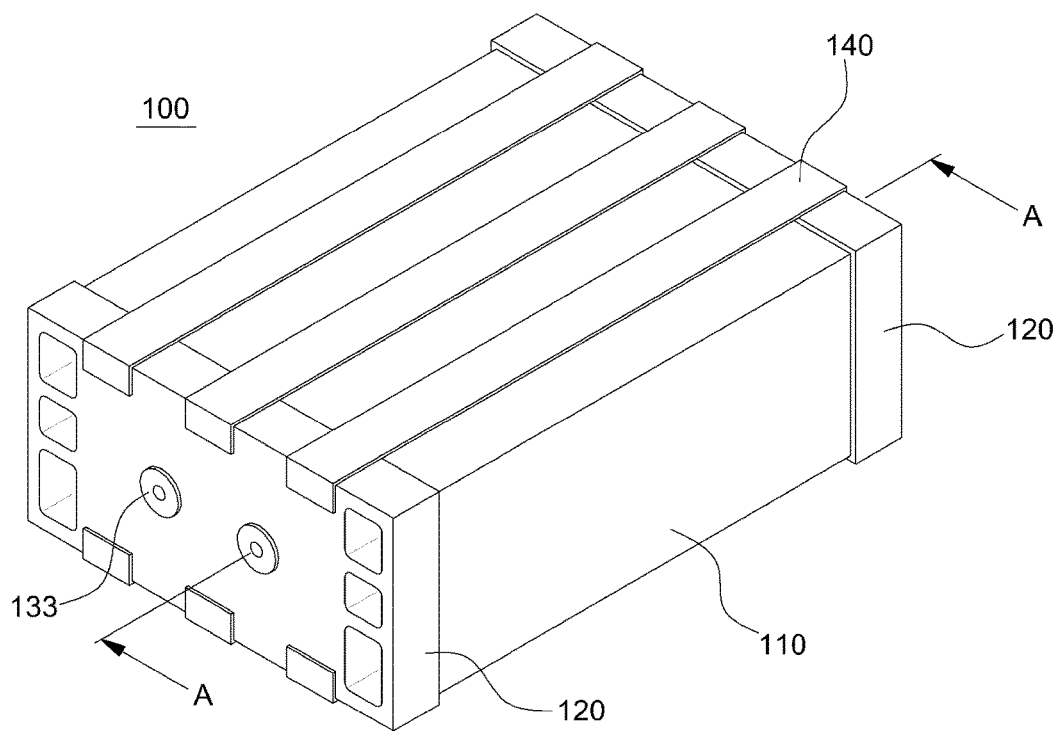
FIG. 1 is a view illustrating an external appearance of a fuel cell stack according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Typically, when a fuel cell vehicle performs a cold start at a temperature equal to or less than about −20° C., the components thereof may be thermally contracted by cooling, and thus the fastening surface pressures and lengths of the components in the stacked direction thereof are reduced. In particular, it may be possible to adopt a structure for increasing the temperature of each end cell of a stack when the vehicle is started at temperatures below zero, based on a reduction in fastening load between a collector plate and the end cells (e.g., cells disposed at both ends of the stack adjacent to end plates) and the resultant increase in contact resistance.

The present invention utilizes a multilayer current collector having at least one thin collector plate, rather than existing single-layer collector plates. In an exemplary embodiment of the present invention, a multilayer current collector, which includes a thin collector plate having a minimal thickness and a thick collector plate disposed and stacked on the rear surface thereof, may be formed to form a gap between the collector plates, i.e. an interlayer gap usable as a thermal insulator such as an air pocket, at temperatures below zero.

When the interlayer gap is formed at a low temperature of about −20 to −30° C. and the contact resistance between the collector plates is minimized by the fastening pressure of the stack at a temperature of about 40 to 70° C., the end cells of the stack may be heated via a bimetal mechanism without requiring separate heating power or temperature monitoring. In the multilayer current collector including the collector plates having different thicknesses, current may be mainly applied to the thin collector plate when the vehicle is started at temperatures below zero. When a high-potential electromotive force generated by the stack cell, and a current generated by a reaction over a substantial area during the startup of the vehicle at temperatures below zero are applied to the thin collector plate, joule heating may be generated by the application of high current.

Figure 2:
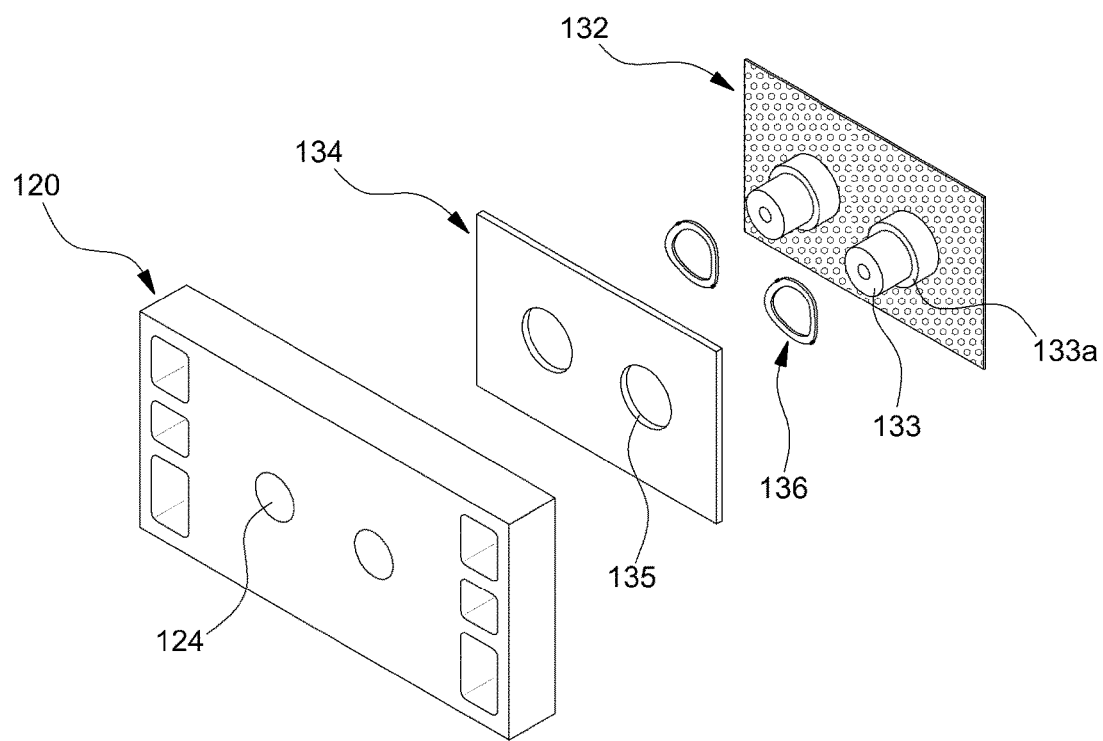
FIG. 2 is a detailed view illustrating main components of the fuel cell stack according to the exemplary embodiment of the present invention.
Figure 3:
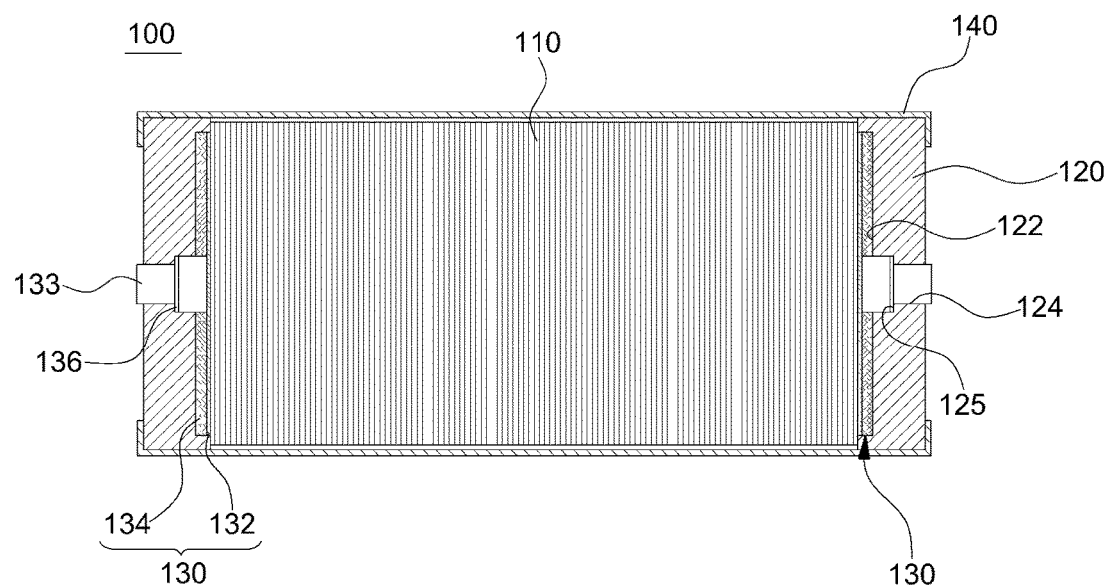
FIG. 3 is a cross-sectional view taken along line "A-A" of FIG. 1 according to the exemplary embodiment of the present invention.

Hereinafter, an exemplary embodiment of the present invention will be described in detail with reference to the accompanying drawings. FIG. 1 is a view illustrating an external appearance of a fuel cell stack according to an exemplary embodiment of the present invention. FIG. 2 is a detailed view illustrating main components of the fuel cell stack according to the exemplary embodiment of the present invention. FIG. 3 is a cross-sectional view taken along line "A-A" of FIG. 1. Further, end cells refer to cells disposed at both ends of a stack 100 adjacent to end plates 120.

As illustrated in FIGS. 1 to 3, a fuel cell stack 100 may include a plurality of stack cells 110 stacked and arranged in a line at the center thereof to generate electricity, end plates 120 disposed at the left and right sides thereof to fixedly support the stack cells 110, and current collectors 130 disposed inside the respective end plates 120 to collect electricity generated by the stack cells 110 and transmit the same to the outside.

At least one of the current collectors 130 disposed at opposite sides of the stack in the stacked direction of the stack cells 110 may include a first thin collector plate 132 which has a current collection terminal 133 disposed at a particular height based on the thickness of the associated end plate 120, and a second collector plate 134 stacked on one surface (e.g., the surface facing the end plate) of the first collector plate 132. The current collection terminal 133 may be formed with a stepped portion 133a which may operatively accommodate an elastic member 136.

FIGS. 1 to 3 illustrate an exemplary embodiment to which a double-layer current collector configured to stack two collector plates, namely the first and second collector plates 132 and 134, is applied. The first collector plate 132 may be formed as a thin metallic conductor having a minimal thickness. The first collector plate 132 may have a rough structure (e.g., rough topography) formed on one surface thereof facing the second collector plate 134 through an embossing process, to retain heat generated by the cell adjacent to the end plate 120 when the vehicle is started at sub-zero or low temperatures, to increase the temperature of the cell, and to maintain the proper stacked pressure (load) and electric connection of the first collector plate 132 with respect to the expansion and contraction of the stack cells 110 in the stacked direction thereof.

In the exemplary embodiment of the present invention, the first collector plate 132 may be a collector plate stacked to come into contact with the stack cells 110. Particularly, the second collector plate 134 may be stacked on the surface opposite to the first collector plate 132. The current collection terminal 133 may be integrally bonded to the first collector plate 132 by brazing, soldering, friction welding, etc., may be assembled to the first collector plate 132 in a bolting or riveting manner by fastening mechanism such as bolts and rivets, or may be electrically connected to the first collector plate 132 by mechanical and physical contact therewith, rather than assembly and bonding.

The second collector plate 134 may be a thick collector plate having a greater thickness than the first collector plate 132, and may be formed as a plate type conductor made of copper, a copper alloy, aluminum, coated stainless steel, or carbon. The second collector plate 134 may include an aperture 135 having a diameter suitable for passing the current collection terminal 133 and the elastic member 136 therethrough. The second collector plate 134 may be a plate having a particular thickness and cross-section, and may be fixed into a collector accommodation portion 122 formed on one surface (e.g., the surface facing the stack cells) of the end plate 120. Additionally, the second collector plate 134 may be fixed into the collector accommodation portion 122 by bolting or may be attached using an adhesive. In addition, although not illustrated in the drawings, the second collector plate 134 may be fitted into a groove formed in the inner surface of the collector accommodation portion 122.

Figure 4:
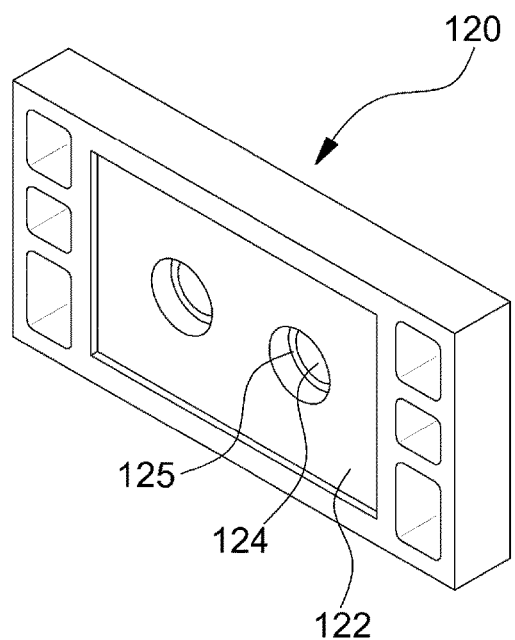
FIG. 4 is a view illustrating an end plate of the fuel cell stack according to the exemplary embodiment of the present invention.

As illustrated in FIG. 4, the collector accommodation portion 122 for accommodating at least the second collector plate 134 may be formed on one surface of the end plate 120 facing the stack cells 110. At least one terminal aperture 124 formed in the collector accommodation portion 122 may extend in the stacked direction of the stack cells 110 to penetrate the end plate 120 in the thickness direction thereof.

Figure 5:
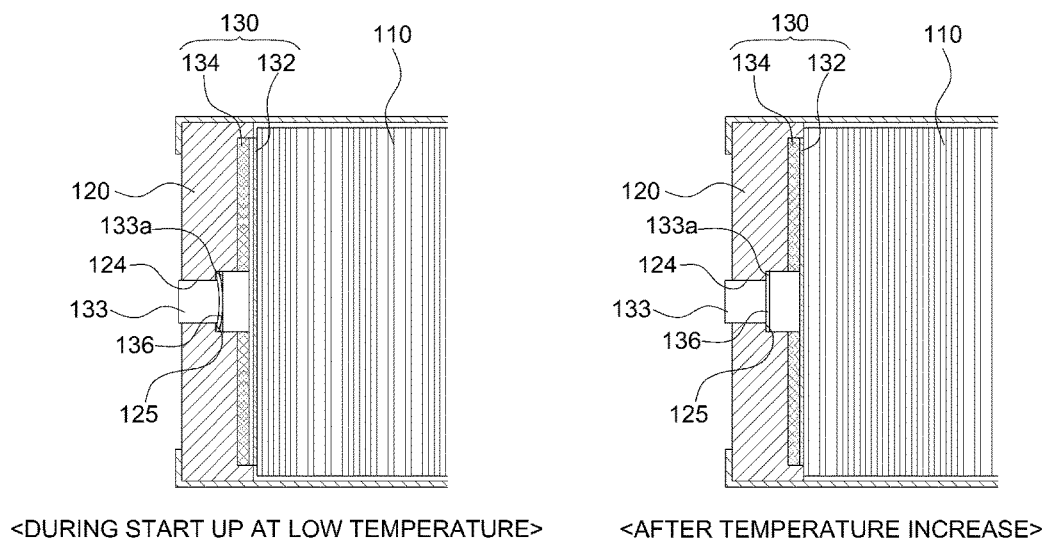
FIG. 5 is a view illustrating a state of operation of the fuel cell stack according to the exemplary embodiment of the present invention.
Figure 6:
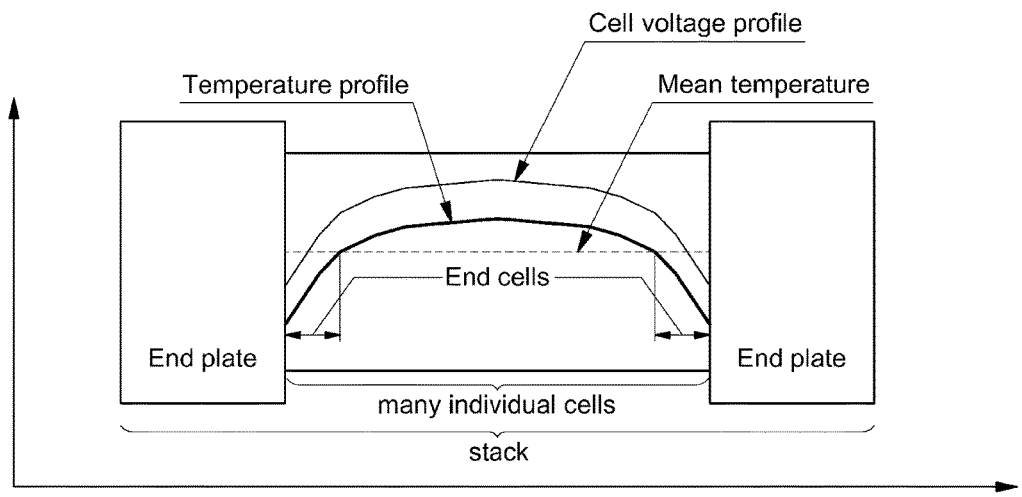
FIG. 6 is a view illustrating a cell temperature profile when a conventional fuel cell stack is operated according to the related art.

In particular, the collector accommodation portion 122 may have a concave structure accommodate the thickness and cross-sectional area of the current collector 130 when the first collector plate 132 is in contact with (e.g. abuts) the second collector plate 134. Referring to FIG. 5, when the vehicle is started at temperatures below zero, a gap may be formed between the first collector plate 132 and the second collector plate 134 by the thermal contraction of the stack cells, and the first collector plate 132 may protrude outward from the collector accommodation portion 122. When the vehicle is started normally (e.g., not at temperatures below zero degrees) after an increase in temperature, the first collector plate 132 may be pressed against the second collector plate 134 by the thermal expansion of the stack cells to enter the collector accommodation portion 122.

The terminal aperture 124 may accommodate the current collection terminal 133 of the first collector plate 132, and may have a depth (length) that corresponds to the height (length) of the current collection terminal 133. The terminal aperture 124 may also have a stepped portion 125 (e.g., different height levels), formed longitudinally=at the center thereof to operatively accommodate the elastic member 136 to elastically support the current collection terminal 133.

The current collection terminal 133 of the first collector plate 132 may be inserted through the aperture of the second collector plate 134 and the terminal aperture 124 of the end plate 120. The elastic member 136 may be accommodated between the stepped portion 133a of the current collection terminal 133 and the stepped portion 125 of the terminal aperture 124, which face each other when the current collection terminal 133 is inserted into the terminal aperture 124. According to the above-described arrangement, the first collector plate 132 may be elastically supported by the elastic member 136.

Accordingly, as illustrated in FIG. 5, the first collector plate 132, which forms a gap with the second collector plate 134 when the stack cells are thermally contracted when the vehicle is started at temperatures below zero, may be elastically supported by the elastic member 136 to be more stably pressed against the end cell. In other words, the elastic member 136 may elastically support the first collector plate 132, and may stably maintain the gap generated between the first and second collector plates 132 and 134 when the vehicle is started at temperatures below zero. The elastic member 136 may be a spring member such as a ring-shaped leaf spring or a coil spring, or may be made of elastomeric materials such as polymer and rubber.

The fuel cell stack 100 according to the exemplary embodiment of the present invention includes the above-mentioned current collector 130 disposed inside at least one of the end plates 120 at the opposite sides of the stack cells 110. As illustrated in FIG. 1, the fuel cell stack 100 may include a fixed fastening mechanism such as fastening bands 140 or fastening bars, and the fastening surface pressure of the fastening mechanism may be applied to the end plates 120 at the opposite sides of the stack 100.

Further, in the fuel cell stack 100, the fastening load applied to each end plate 120 at extremely low temperatures below zero may be reduced due to the contract of the component by cooling, compared to an initial load. Accordingly, fastening force (e.g., contact force) between the end plate 120 and the end cell may be reduced, and a fine gap may be formed therebetween. In particular, the first collector plate 132 may be configured to move from the end plate 120 to the end cell by the elastic member 136 to be pressed against the end cell. Consequently, the first collector plate 132 may be separated from the second collector plate 134, and the gap may be formed between the first and second collector plates 132 and 134.

The fine gap formed between the first and second collector plates 132 and 134 may function as a thermal insulator such as an air pocket at temperatures below zero. Accordingly, it may be possible to mitigate the loss of joule heating, generated by resistance when a current is applied to the first collector plate 132, and the loss of waste heat generated by the end cell, when the vehicle is started at temperatures below zero, to increase the heating rate of the cell and improve the starting speed of the stack. Accordingly, since a thermal loss may be minimized by utilizing the gap, which is formed in the current collector 130 by the thermal contraction of the stack cells 110 when the fuel cell vehicle is started at temperatures below zero and is driven at low temperatures, as a thermal insulator, it may be possible to realize the rapid thawing and heating of the end cell to mitigate a reduction in cell voltage due to the low temperature of the end cell.

In addition, when the temperature of the cells disposed adjacent to each end plate 120 at both ends of the stack 100 is increased by the joule heating of the first collector plate 132 and the waste heat of the end cell, and the vehicle is started normally, the stack cells 110 may be thermally expanded in the stacked direction thereof by the increase in temperature of the stack. Particularly, the first collector plate 132 may be moved from the end cell to the end plate 120 to cause the first collector plate 132 to be pressed against the second collector plate 134. Accordingly, the multilayer current collector 130 including the first and second collector plates 132 and 134 may perform current collection and application similar to existing single-layer current collectors having about the same thickness and cross-sectional area as those of the multilayer current collector, when the stack is operated after the vehicle is started normally. Therefore, separate control or additional mechanisms may be eliminated.

In other words, when the temperature of the end cell is increased by the joule heating of the current collector 130, and the stack cells are thermally expanded in the stacked direction thereof by the increase in temperature of the stack when the vehicle is started normally, the first collector plate 132 may come into contact with (e.g., abut) the second collector plate 134. Particularly, since the current collector 130 may be configured to perform the same current collection and application functions as existing current collectors having typical thicknesses and cross-sectional areas, separate control or additional expensive mechanisms therefor may be omitted.

When the current collector is configured by stacking thin collector plates in a multilayer form, the thickness and shape of each thin collector plate and the connection structure between the collector plates may be varied. Accordingly, it may be possible to realize various additional functions, for example to form an electric conductor having pores or a plurality of gaps to perform thermal insulation as a main function, and to freely adjust (e.g., increase or decrease) the generation of joule heating by forming the conduction path of through-current in various manners. For example, in the exemplary embodiment of the present invention, the first collector plate 132 as a thin collector plate may have a thickness of about 0.05 to 0.2 mm.

Additionally, when the thickness of the first collector plate 132 is greater than about 0.2 mm, it may be difficult to generate desired joule heating by the application of high current. When the thickness of the first collector plate 132 is less than about 0.05 mm, it may be difficult to generate and maintain the gap between the first and second collector plates 132 and 134 due to the elastic force of the elastic member 136 applied through the current collection terminal 133, and it may be difficult to maintain the shape and durability of the first collector plate 132 when the first collector plate 132 comes into contact with the second collector plate 134.

When the thickness of the first collector plate 132 is greater than the above-described range, it may be difficult to generate a desired gap (e.g., an interlayer gap) at a low temperature of about −20 to −30° C., and it may be difficult to form minimum areal resistance uniformly or minimum contact resistance due to the fastening pressure of the stack at a temperature of about 40 to 70° C. When the first collector plate 132 has low flexural strength due to having a minimal thickness, a reduction in voltage may be caused by non-uniform surface contact due to the bending of the first collector plate 132, etc.

In accordance with the present invention, since a multilayer current collector may be interposed between end plates and end cells (e.g., cells which are located at both ends of a stack adjacent to the end plates), it may be possible to improve the starting speed and operability of the stack by increasing the heating rate of each end cell of the stack when a fuel cell vehicle is started at temperatures below zero or is driven at low temperatures, and to improve the start up of the stack at temperatures below zero by mitigating a reduction in cell voltage due to the low temperature of the end cell.

Specifically, the present invention adopts a multilayer current collector having at least one thin collector plate operated in response to thermal expansion or contraction of the stack cells, which occurs in response to temperature changes. Accordingly, a gap which functions as a heat insulation, may be formed between first and second collector plates which are stacked in the direction in which cells are stacked due to the thermal contraction of the stack cells when the vehicle is started at temperatures below zero. Consequently, since the joule heating of the current collector and the waste heat generated by the end cell, which are generated by the application of current generated by the stack cells when the vehicle is started at temperatures below zero or is driven at low temperatures, may be insulated by the gap, the temperature of the end cell may be rapidly increased.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A fuel cell stack with a multilayer collector plate, comprising:
    end plates disposed at opposite sides of stack cells stacked in a line to fixedly support the stack cells; and
    current collectors disposed inside the end plates to collect electricity generated by the stack cells and configured to transmit the electricity to the outside,
    wherein at least one of the current collectors disposed at the opposite sides of the stack cells includes a first collector plate having a current collection terminal, and a second collector plate stacked on one surface of the first collector plate,
    wherein the first collector plate is elastically supported by an elastic member to be pressed against an end cell of the stack cells,
    wherein the first collector moves from the end plate to the end cell by the elastic member to form a gap between the first and second collector plates when the stack cells are thermally contracted, and
    wherein the second collector plate is not supported by the elastic member such that the gap is formed between the first collector plate and the second collector plate by the thermal contraction of the stack cells.

2. The fuel cell stack of claim 1, wherein an elastic member is inserted between a terminal aperture formed in each of the end plates and the current collection terminal of the first collector plate passing through the terminal aperture, to elastically support the current collection terminal.

3. The fuel cell stack of claim 2, wherein stepped portions are respectively formed in the terminal aperture and the current collection terminal, and the elastic member is accommodated between a stepped portion of the current collection terminal and a stepped portion of the terminal aperture, which face each other when the current collection terminal is inserted into the terminal aperture.

4. The fuel cell stack of claim 1, wherein the first collector plate has a rough structure on one surface thereof facing the second collector plate.

5. The fuel cell stack of claim 1, wherein the first collector plate is a thin collector plate having a thickness less than that of the second collector plate.

6. The fuel cell stack of claim 5, wherein the first collector plate is stacked to abut the stack cells, and the current collection terminal of the first collector plate is inserted through an aperture in the second collector plate and a terminal aperture in the associated one of the end plates.

7. The fuel cell stack of claim 5, wherein the first collector plate has a thickness of about 0.05 to 0.2 mm.

8. The fuel cell stack of claim 1, wherein the gap is formed between the first and second collector plates at a temperature of about −20 to −30° C., and the first and second collector plates form a minimum contact resistance by fastening pressure of the stack when the temperature is increased to a predetermined temperature above zero.

9. The fuel cell stack of claim 8, wherein the first and second collector plates form a minimum contact resistance by the fastening pressure of the stack at a temperature of about 40 to 70° C.

10. The fuel cell stack of claim 1, wherein the current collection terminal is bonded to the first collector plate to be integrated therewith, is assembled to the first collector plate to be integrated therewith by a fastening mechanism, or is pressed against the first collector plate to be electrically connected thereto.

* * * * *